(12) United States Patent
Borich et al.

(10) Patent No.: US 11,243,160 B2
(45) Date of Patent: Feb. 8, 2022

(54) CUSTOM OPTICAL REFERENCE CALIBRATOR FABRICATION SYSTEM

(71) Applicant: Detekt Biomedical, L.L.C., Austin, TX (US)

(72) Inventors: Damon Vincent Borich, Austin, TX (US); Michelle Silveyra, Austin, TX (US); Alejandro Silveyra, Austin, TX (US); Andrea Grbavac, Austin, TX (US); Zwckxally Obregon, Cedar Creek, TX (US)

(73) Assignee: DETEKT BIOMEDICAL, LLC, Austin, TX (US)

(*) Notice: Subject to any disclaimer, the term of this patent is extended or adjusted under 35 U.S.C. 154(b) by 365 days.

(21) Appl. No.: 16/355,933

(22) Filed: Mar. 18, 2019

(65) Prior Publication Data
US 2019/0302009 A1    Oct. 3, 2019

Related U.S. Application Data

(60) Provisional application No. 62/649,332, filed on Mar. 28, 2018.

(51) Int. Cl.
G01N 21/27  (2006.01)
G01N 21/78  (2006.01)
G01N 21/84  (2006.01)
G01N 21/77  (2006.01)

(52) U.S. Cl.
CPC .......... *G01N 21/278* (2013.01); *G01N 21/78* (2013.01); *G01N 21/8483* (2013.01); *G01N 2021/7759* (2013.01); *G01N 2021/7786* (2013.01); *G01N 2021/8488* (2013.01)

(58) Field of Classification Search
CPC .. G01N 21/278; G01N 21/8483; G01N 21/78; G01N 2021/8488; G01N 2021/7786; G01N 2021/7759
See application file for complete search history.

(56) References Cited

U.S. PATENT DOCUMENTS

| | | |
|---|---|---|
| 6,136,610 A | 10/2000 | Polito et al. |
| 6,180,409 B1 | 1/2001 | Howard, III et al. |
| 6,528,323 B1 | 3/2003 | Thayer et al. |
| 7,027,146 B1 | 4/2006 | Smith et al. |
| 7,267,799 B1 | 9/2007 | Borich et al. |
| 7,365,849 B2 | 4/2008 | Yao et al. |
| 7,444,005 B2 | 10/2008 | Bachur, Jr. et al. |

(Continued)

*Primary Examiner* — Samuel P Siefke
*Assistant Examiner* — Henry H Nguyen
(74) *Attorney, Agent, or Firm* — Kowert, Hood, Munyon, Rankin & Goetzel, P.C.; Gareth M. Sampson

(57) ABSTRACT

Systems and methods for producing a calibration standard for an optical analysis system (e.g., a diagnostic reader) from a live test sample are disclosed. The calibration standard may include an image reproduced on a substrate. The reproduced image may be a replication of a digital image of a live test sample captured using the optical analysis system and then digitally processed to be reproduced on the substrate. The image reproduced on the substrate may include at least one optical feature digitally added to the replication of the digital image of the live test sample. The added optical features may be used to allow for more robust calibration using the calibration standard.

15 Claims, 16 Drawing Sheets

(56) References Cited

U.S. PATENT DOCUMENTS

| | | | |
|---|---|---|---|
| 7,599,051 B1* | 10/2009 | Labovitz | G01N 21/278 |
| | | | 356/237.2 |
| 7,632,460 B2 | 12/2009 | Catt et al. | |
| 7,939,342 B2 | 5/2011 | Song et al. | |
| 8,367,013 B2 | 2/2013 | Kaylor et al. | |
| 10,132,802 B2 | 11/2018 | Ehrenkranz | |
| 2003/0119203 A1 | 6/2003 | Wei et al. | |
| 2007/0231922 A1 | 10/2007 | Petruno et al. | |
| 2008/0080781 A1* | 4/2008 | Pote | A61B 5/441 |
| | | | 382/255 |
| 2010/0321681 A1* | 12/2010 | Chen | G01J 3/506 |
| | | | 356/243.1 |
| 2011/0217205 A1 | 9/2011 | Peeters | |
| 2012/0083044 A1 | 4/2012 | Sturman et al. | |
| 2012/0300211 A1 | 11/2012 | Wang | |
| 2013/0244339 A1 | 9/2013 | Ehrenkranz et al. | |
| 2015/0310634 A1* | 10/2015 | Babcock | G06T 7/90 |
| | | | 382/165 |
| 2016/0103075 A1 | 4/2016 | Borich et al. | |
| 2016/0178607 A1* | 6/2016 | Husheer | G01N 33/48771 |
| | | | 422/82.09 |
| 2016/0223536 A1 | 8/2016 | Johnson et al. | |
| 2017/0138854 A1* | 5/2017 | Gammon | G01N 33/22 |
| 2017/0184506 A1* | 6/2017 | Patel | G01N 33/521 |
| 2017/0248516 A1* | 8/2017 | Meier | H04N 1/6033 |

* cited by examiner

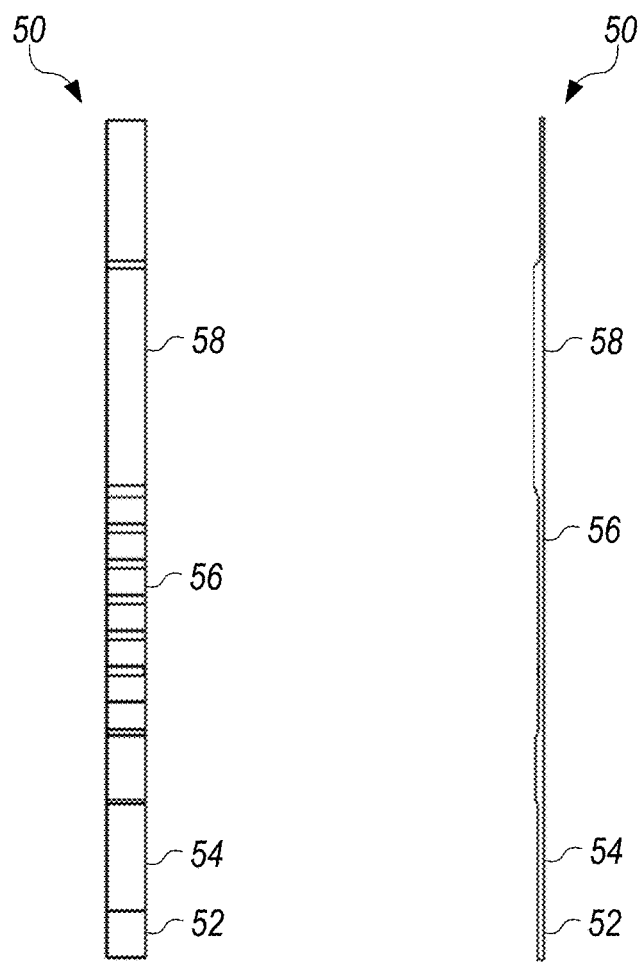
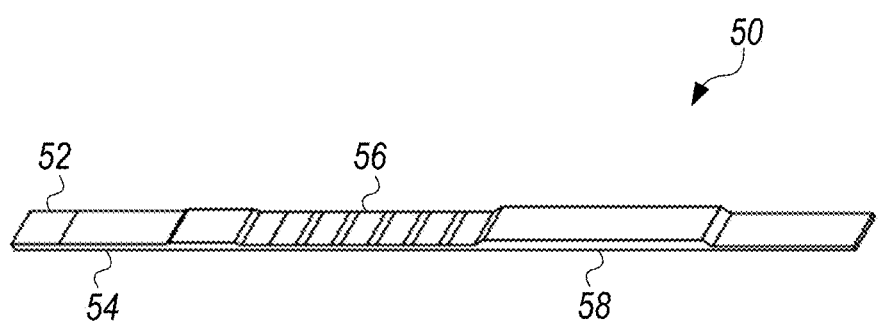
FIG. 1A  FIG. 1B
FIG. 1C

CUSTOM OPTICAL REFERENCE CALIBRATOR FABRICATION SYSTEM

PRIORITY CLAIM

This patent claims priority to U.S. Provisional Patent Application No. 62/649,332 to Borich et al., entitled "HANDHELD STRIP READER", filed Mar. 28, 2018, which is incorporated by reference in its entirety.

BACKGROUND

1. Technical Field

Embodiments described herein relate to systems and methods for providing optical reference standards for diagnostic readers. More particularly, embodiments described herein relate to systems and methods for producing custom optical reference standards that mimic lateral flow, dry chemistry test strips, or biochip optical outputs used in rapid test diagnostic readers.

2. Description of Related Art

Rapid diagnostic tests are routinely used for a variety of diagnostic needs ranging from simple over-the-counter pregnancy tests to contamination testing of food and beverages, water quality testing, healthcare testing, and/or environmental testing. Many of these tests are visually read and are in the format of a lateral flow or dry chemistry assay that produces a visible color change or presence of a line on a test strip.

Lateral flow assay tests are generally comprised of a cassette or cartridge that houses unique paper-based mediums such as nitrocellulose. These mediums, when dosed and allowed to develop, may provide rapid results in the form of visible line formation, which can be either quantitative or qualitative in nature. The test is typically performed by placing a small amount of fluid on the sample pad located at one end of the strip. The fluid is then absorbed and wicked through the conjugate pad, which contains antibodies and/or antigens that have been labeled with a fluorescent or color agent such as colloidal gold. As the fluid flows, the labeled reagents are pulled into the nitrocellulose pad containing specifically placed test and control line antibodies or antigens. Depending on the type of assay, the labeled reagents from the conjugate pad will bind to the test line antibodies/antigens based on the presence or absence of a target analyte in the sample. When the reagents bind, the color agent forms a line that is visible to the user, indicating the result of the test.

FIGS. 1A-C depict an example of the four primary regions of a lateral flow test strip. Strip 50 includes sample pad 52, conjugate pad 54, test and control line region 56, and absorbent pad 58. Test and control line region 56 may include, for example, a nitrocellulose membrane containing test and control line antibodies or antigens.

Rapid diagnostic test strip assay instruments that utilize optical sensing and imaging, referred to as diagnostic readers or readers, have gained popularity in many industries, including, but not limited to, food and beverage safety, environmental monitoring, water quality, and human and animal health. Optical lateral flow readers utilize CMOS sensors or photodiodes along with LED illumination to capture optical readings from a specific cartridge insertion region in the reader. Some readers are capable of analyzing multiple types of assays ranging from lateral flow, dry chemistry, biochip, to cuvettes and vials with liquids. Traditional imaging systems have utilized smaller photodiodes that only capture a discrete region of a test strip; however, other systems such as the RDS-2500 reader available from Detekt Biomedical, LLC. (Austin, Tex.)(shown in FIGS. 4-6 and described herein), utilize a large CMOS sensor with the ability to capture the entire cartridge. Having the ability to capture the entire cartridge may ensure the ability to read multiple types and configurations of test strips and cassettes. These readers may be used to monitor and report results for lateral flow test strip assays and similar test types.

FIG. 2 depicts a flow chart of an example of an embodiment of method 100. Method 100 may be used to analyze a test strip in a reader using a multi-step process. In 102, a cartridge or sample is inserted into the reader. In 104, the reader (e.g., an RDS-2500 reader), acquires (takes) one or more images of the test region of interest. In 106, the test type and the number of discrete regions to be analyzed are determined. In some embodiments, the reader may automatically identify the test type and the number of discrete regions to be analyzed. In some embodiments, the user can indicate which type of test has been inserted for analysis. In 108, the reader may, using a predefined test database, define the boundaries of each discrete region based on the test parameters.

If the test is a lateral flow strip, the reader may find the peak intensity in each region in 110. These peaks may then be used to quantify the lines with a specific intensity in 112. If the test is a colorimetric dry chemistry test, the reader may quantify the specific color of the region in 112. These quantified values are then used to calculate a final test result in 114. For lateral flow tests, the final test result may be the raw intensity value of each line, a ratio of test to control line, and/or a custom equation or cutoffs determined by the test type.

Before readers such as the RDS-2500 were available, the user would compare the color of the test line to a color key to decide if a test was positive or negative. The use of this type of instrument reduces the risk of human errors when reading test results. Test strip readers can also provide more exact analysis of the test and control lines, allowing for the development of more specific quantitative assays. This increase in required reader sensitivity has thus stimulated the need for more accurate calibration methods and standard cartridges.

Test strip readers may also be utilized for error-free testing of dry chemistry tests. Dry chemistry tests are a type of rapid test comprised of, for example, a dry pad of absorbent material that is impregnated with a dye reagent. When the fluid to be analyzed is added to the pad, the absorbent pad changes color. Without a reader, these tests are typically read by a user by comparing the color of their test result to a color key printed on a paper.

An example of a dry chemistry test strip is shown in FIGS. 3A-C. Strip 150 may include multiple reagent pads 152 on substrate 154. Reagent pads 152 may be dosed individually with liquid samples (e.g., each pad is individually dosed with a different liquid sample).

As lateral flow and dry chemistry assays have improved over time, these assays have increased the complexity of interpretation of the outcome as multiple lines and colored regions can be produced on a single test strip where the lines and regions need to be ratioed and compared to one another in a particular sequence to obtain an accurate result. This complexity has stimulated the need for a more automated calibration and verification standard.

One challenge associated with the development of these readers is the lack of available controllable standards. Other similar optical testing instruments, like a spectrophotometer, have a variety of NIST traceable optical standards that can be used to validate and/or calibrate the device. Standards like these are important to ensure that all devices will produce the same result and that each device continues to produce this same result throughout its lifetime.

Previous standards that have been used to validate lateral flow test strip readers include pre-run assays with pre-formed lines, colloidal gold or latex particle lines printed on nitrocellulose, and various other inks or colorations printed on paper or other materials. However, these standards have inherent drawbacks. For example, pre-run assays can degrade over time as the test strip dries and cannot be replicated consistently batch to batch due to the nature of the variability of the colored reagents adsorption onto mediums such as nitrocellulose. Lateral flow test strips can also be fragile and damaged with repeated use. Printing colloidal gold directly onto nitrocellulose may be difficult to repeat with the required specificity and, as with the pre-run assays, the nitrocellulose can degrade or become damaged over time. Printing lines directly onto standard printing paper presents similar challenges to printing gold onto nitrocellulose—e.g., printing is often difficult to reproduce and paper degrades over time.

One specific challenge with printing ink onto standard printing paper is that most normal inks become reflective when they dry. Reflective surfaces do not respond to the optical system in a consistent manner in a test strip reader the same way as live wet strips do. The reflections create glare on the test lines and these glare spots become overexposed in the image used for analysis, changing the color, consistency, and/or intensity of the test result line.

A standard used for calibration and verification should therefore be robust, consistent, and reproducible. Each replication of the standard should produce the same result. The quality and appearance of the standard should remain the same over time. The standard should ideally have the same photographic properties of a live test strip—e.g., the standard should not be reflective or become opaque when imaged.

Most optical instruments have a calibration standard that is used to verify the proper function of the instrument. The standards may take the form of a traceable color standard, a material with a known absorption and emission wavelength or profile, or a fluid or reagent of a known concentration. However, these standards often do not accurately represent the real-world testing environment and/or mediums utilized during live testing. In particular, routine optical standards represent a pristine scenario that assumes no commonly occurring variants or impediments to testing are present. While this may be appropriate for laboratory equipment, it may not be sufficient for equipment that is used in austere environments or is rarely tested in a clean and controlled manner.

Thus, there is a need for systems and methods to digitally and physically reproduce and consistently replicate actual live testing samples results and specific scenarios. For example, such systems and methods may utilize the collection of optical images and, through a unique printing process, replicate in the form of a reference standard, a novel customer specific calibration cartridge standard.

SUMMARY

In certain embodiments, a calibration standard for an optical analysis system includes an image reproduced on the substrate. The substrate may be sized and shaped to be at least partially inserted into an optical analysis system (e.g., a diagnostic reader such as the RDS-2500). The reproduced image may be a replication of a digital image of a live test sample captured using the optical analysis system. The reproduced image may include at least one optical feature digitally added to the replication of the digital image of the live test sample.

In certain embodiments, a method for producing a calibration standard for an optical analysis system includes capturing a digital image of a live test sample using the optical analysis system. The captured image may be processed (e.g., using a computer processor) to digitally add at least one optical feature to the captured image. The processed captured image may then be reproduced on a substrate to produce the calibration standard. The calibration standard may include the at least one optical feature digitally added to the captured image. The calibration standard may then be placed in the optical analysis system to verify that the calibration standard provides desired testing results using the optical analysis system.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which:

FIGS. 1A-C depict an example of the four primary regions of a lateral flow test strip.

Figure 2:
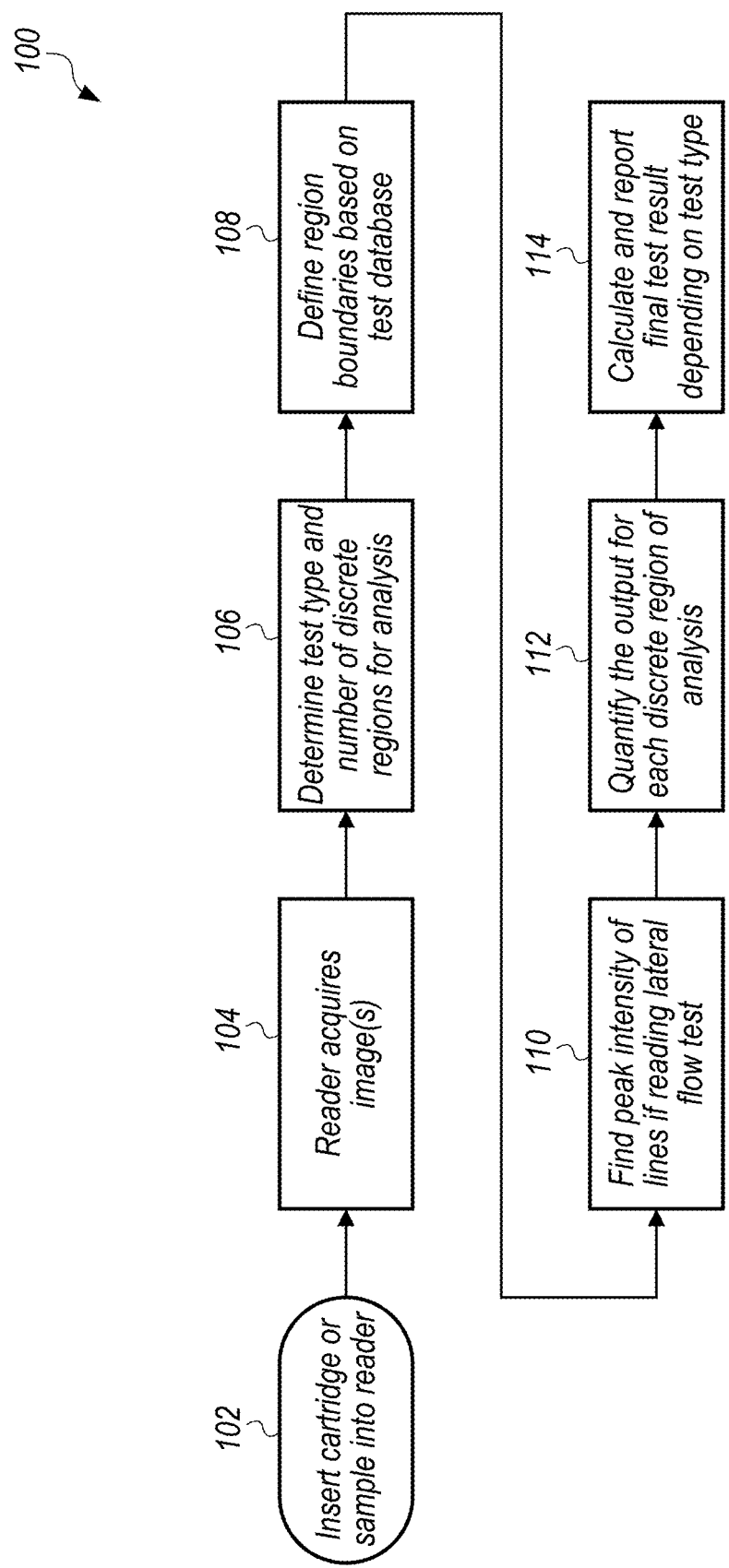
FIG. 2 depicts a flow chart of an example of an embodiment of a method used to analyze a test strip in a reader using a multi-step process.
Figures 3A, 3B:
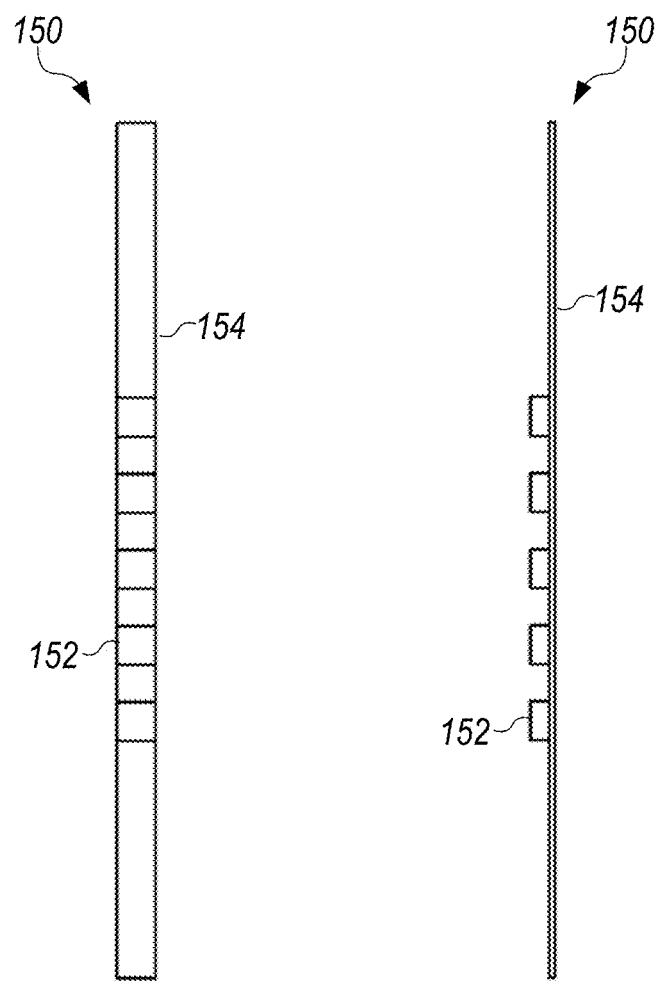
FIGS. 3A-C depict an example of a dry chemistry test strip.
Figure 3C:
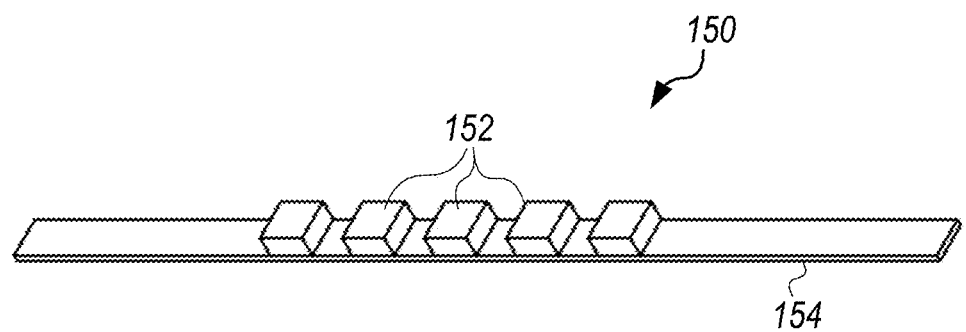

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

Figure 4:
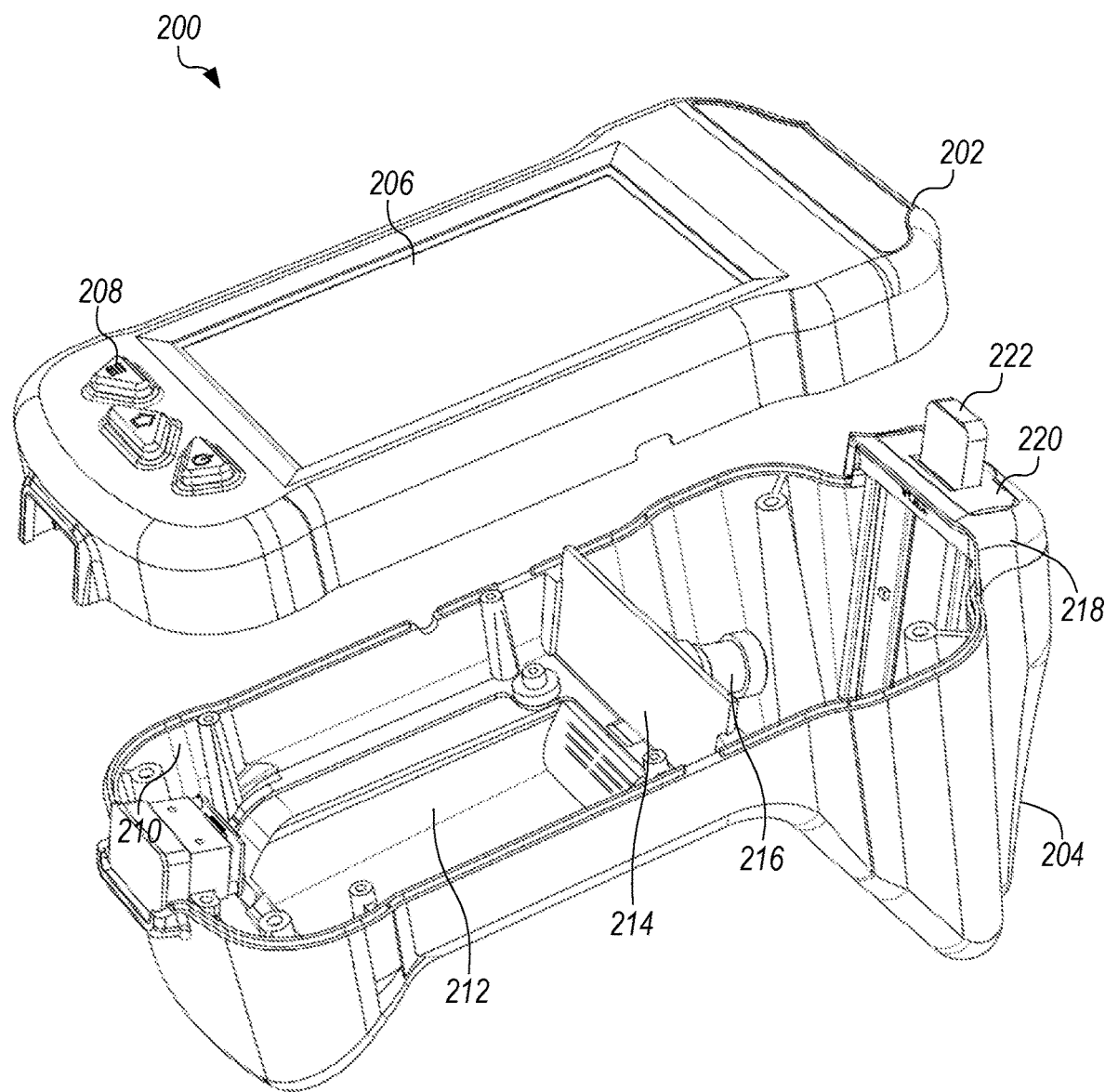
FIG. 4 depicts an exploded view representation of an embodiment of a test strip reader.
Figure 5:
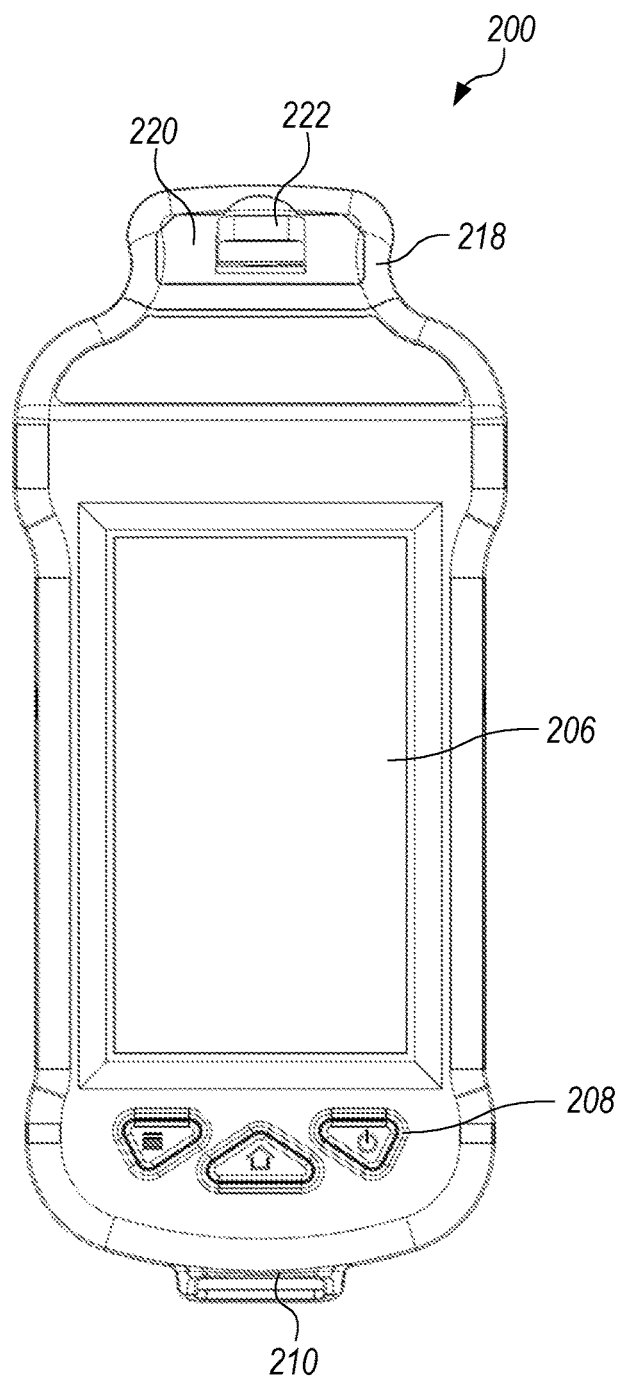
FIG. 5 depicts a top view of an embodiment of a test strip reader.

FIG. 4 depicts an exploded view representation of an embodiment of test strip reader 200. FIG. 5 depicts a top view of an embodiment of test strip reader 200. Reader 200 may be an optical analysis system. In one embodiment, reader 200 is the RDS-2500 test strip reader. Another embodiment of a reader is described in U.S. Pat. No. 7,267,799 to Borich et al., which is incorporated by reference as if fully set forth herein. As shown in FIG. 4, reader 200 may include top portion 202 and bottom portion 204. Top portion 202 may include LCD screen 206 and keypad 208. In some embodiments, LCD screen 206 is a touchscreen for user input. Other methods of user input may also be contemplated.

In certain embodiments, bottom portion 204 includes scanner 210, hardware area 212, optical sensor and illumination circuit board 214, lens 216, and track 218 with sample entry port 220. Scanner 210 may be, for example, a barcode or QR scanner. Hardware area 212 may be an area for custom computing hardware and/or accessories. In certain embodiments, cartridge 222 may be placed in port 220. Cartridge 222 may be, for example, a calibration cartridge or an actual test cartridge, as described herein. Optical sensor and illumination circuit board 214 may face cartridge 222 when the cartridge is inserted in port 220. Reader 200 may be capable of illuminating a sample target in cartridge 222 with a selectable spectrum of light (e.g., light ranging from about 300 nm to about 800 nm) and capturing images of the sample target (e.g., reflections from the sample target) while it is illuminated.

Figure 6:
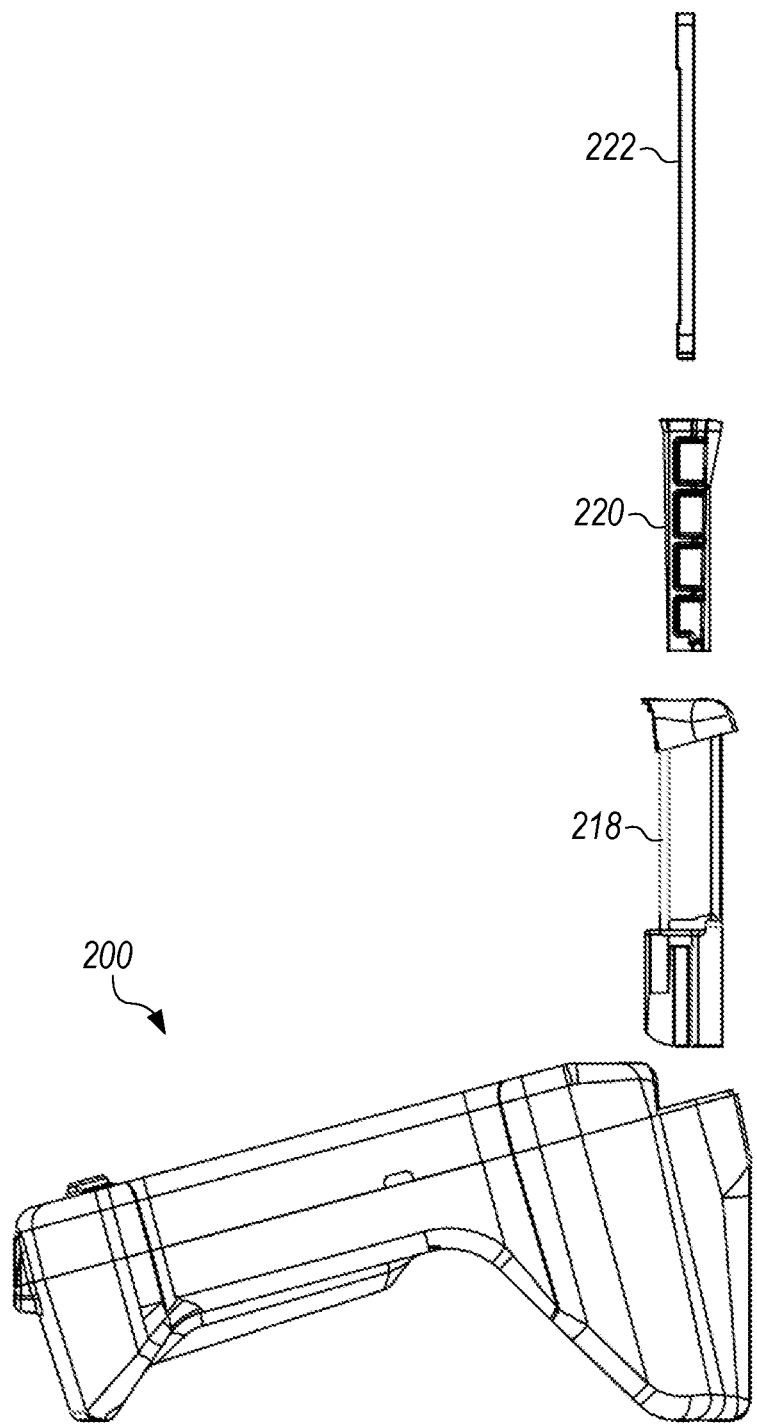
FIG. 6 depicts a side-view representation of a reader showing a track, a port, and a cartridge being removed from the reader.

In some embodiments, track 218 and/or sample entry port 220 may be customized to fit different test strip cartridges and/or calibration cartridges (e.g., different size or types of cartridges 222). Track 218 and/or port 220 may be removable from reader 200 to allow different tracks and/or ports of varying sizes or types to be placed in the reader. FIG. 6 depicts a side-view representation of reader 200 showing track 218, port 220, and cartridge 222 being removed from the reader. In certain embodiments, track 218 is securely mounted (e.g., mounted using fasteners) to reader 200. Track 218 may, however, be removed by removing the fasteners or other securing means to allow other tracks that can accommodate different size ports 220 to be placed in reader 200.

Figure 7:
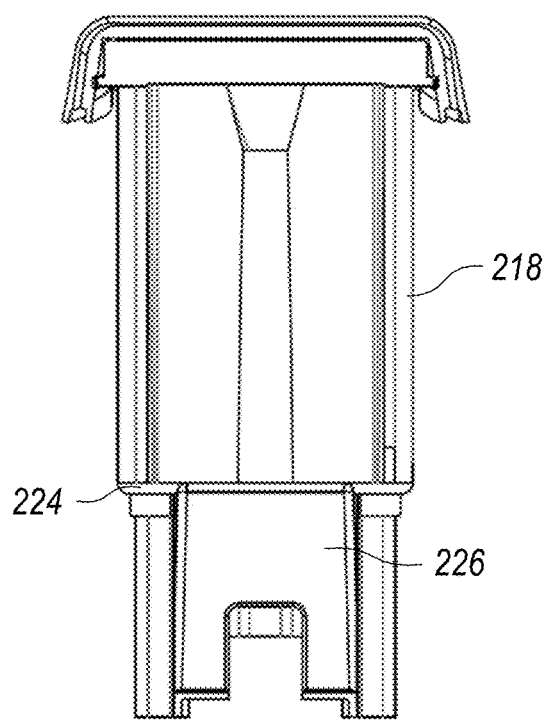
FIG. 7 depicts a representation of an embodiment of a track.

FIG. 7 depicts a representation of an embodiment of track 218. In certain embodiments, track 218 includes magnets 224. Magnets 224 may be used as magnetic attachment guides to guide and locate the insertion of port 220 into track 218. In some embodiments, track 218 includes accessory port 226. Accessory port 226 may be a customizable port to contain accessories on track 218. Accessories may include, but not be limited to, a heater, a vibration motor, environmental sensors, etc.

Port 220 may be designed to accept a certain size and type of cartridge 222 (or cassettes, strips, or assays). Port 220 may be readily swapped out by a user of reader 200 to another port that is designed to accept a different size or type of cartridge 222. The ability to swap out ports 220 and readily use different customized ports in reader 200 allows the reader to be used with a variety of cartridges 222 (test and/or calibration cartridges) as well as live test sample cassettes, strips, or assays. For example, port 220 may accommodate cartridges 222 or cassettes with varying sizes up to about 40 mm in width. The height of cartridges 222 or cassettes may not be limited as long as the region of interest can be viewed by the optical system in reader 200.

Figure 8:
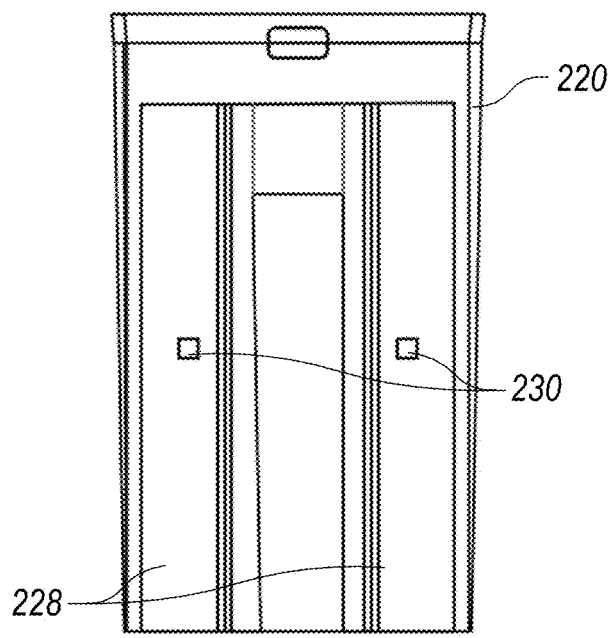
FIG. 8 depicts a representation of an embodiment of a port.

FIG. 8 depicts a representation of an embodiment of port 220. In certain embodiments, port 220 includes magnets 228. Magnets 228 may secure port 220 inside track 218 when the port is inserted into the track. Magnets 228 may, for example, mate or couple to magnets 224 in track 218 to secure port 220 inside the track. In some embodiments, port 220 includes one or more markers 230. Markers 230 may be fiducial markers or other positional indicators that may be used for calibration or regular functionality checks during testing and operation of reader 200. For example, markers 230 may be used to verify that the correct sample port is present and in the proper position for testing in reader 200.

In certain embodiments, a user is able to use reader 200 to capture/acquire image(s), in real-time, multiple types of assays and tests. Reader 200 may also be used to capture a time sequence of digital images of these events (e.g., assays and tests). These images, which may be traditionally analyzed using embedded software algorithms in reader 200 that detect the formation of lines, shapes, and specific colors, may be utilized to replicate a specific live assay. In some embodiments, capturing image(s) in reader 200 includes capturing raw image sensor data.

In certain embodiments, a unique test specific calibration cartridge may be created from live images captured by reader 200. Using reader 200 to create calibration cartridges may allow for optical reference standards to be customized for a specific client's needs and testing scenarios, thus providing a more accurate and robust verification of the systems calibration and performance in actual testing conditions. For example, a user that routinely samples mediums such as stream effluents, flood waters, water processing plants that have turbid samples with sediment may desire to have a reference standard that reflects these sample medium attributes.

Figure 9:
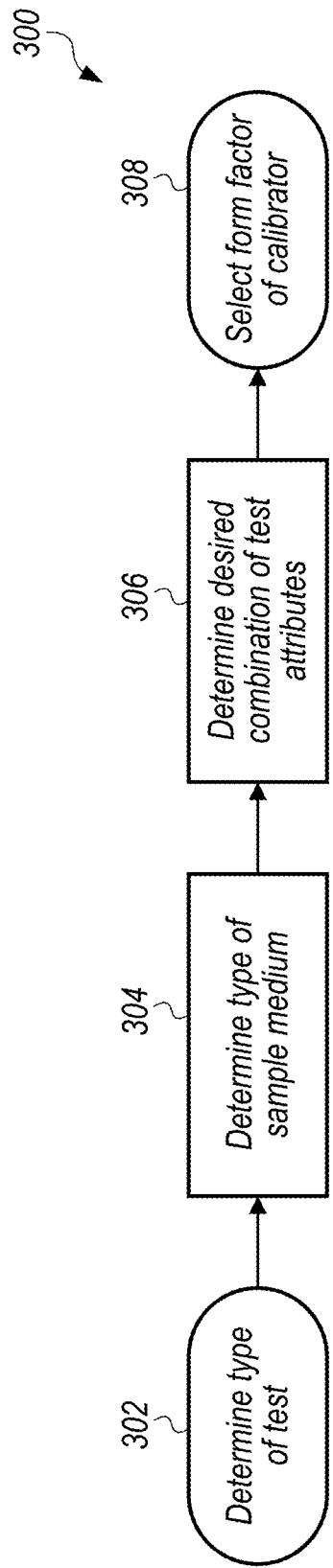
FIG. 9 depicts a flowchart for an embodiment of a process used to identify a general type of calibrator.

In certain embodiments, prior to creating a custom calibration standard, a user may first decide what features and attributes are required for a custom calibration cartridge. FIG. 9 depicts a flowchart for an embodiment of process 300. Process 300 may be used to identify the general type of calibrator (e.g., calibration cartridge) needed along with features needed to be added to the calibrator. Process 300 may begin with determining (selecting) a type of test in 302. For example, the test may be determined to be a lateral flow test, a dry chemistry test, a biochip test, etc. The determined test may be replicated on the calibration cartridge.

In 304, the type of sample medium being tested may be determined. The type of sample medium being tested may determine some of the criteria for image modification such as, but not limited to, how to set appropriate background hue, what, if any, artifacts should be added to the lines, and/or background to imitate the sample.

In 306, the features (attributes) that will be on the calibration cartridge may be determined. For lateral flow test embodiments, the features determined may include the type of standard or non-standard lines to be replicated. For dry chemistry test embodiments, the features determined may include the type of spots needed to represent typical assay and potential reader challenge scenarios. In some embodiments, for any calibration cartridge, determining the features may include determining additional features that may be added to the calibration cartridge. For example, features such as, but not limited to, encoded information, focus region, fiducials, etc. may be added to the calibration cartridge.

In 308, the form factor for the calibrator (calibration cartridge) may be selected. Selecting the form factor may include selecting dimensions of the substrate(s) to properly represent a live assay optical environment.

Figure 10:
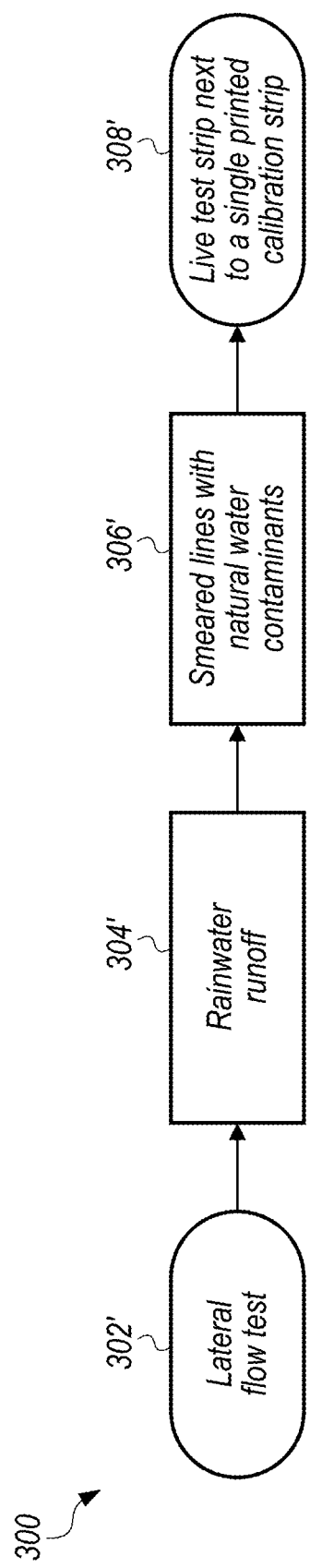
FIG. 10 depicts a flowchart of a non-limiting example of using a process to determine the general type of calibration cartridge for a rainwater test.

FIG. 10 depicts a flowchart of a non-limiting example of using process 300 to determine the general type of calibration cartridge for a rainwater test. In 302', the test may be determined to be a lateral flow test. In 304', the sample medium may be determined to be rainwater runoff. In 306', the features on the calibration cartridge may be determined to be smeared lines with natural water contaminants. In 308', the form factor for the calibration cartridge may be selected to be a live test strip next to a single printed calibration strip.

Figure 11:
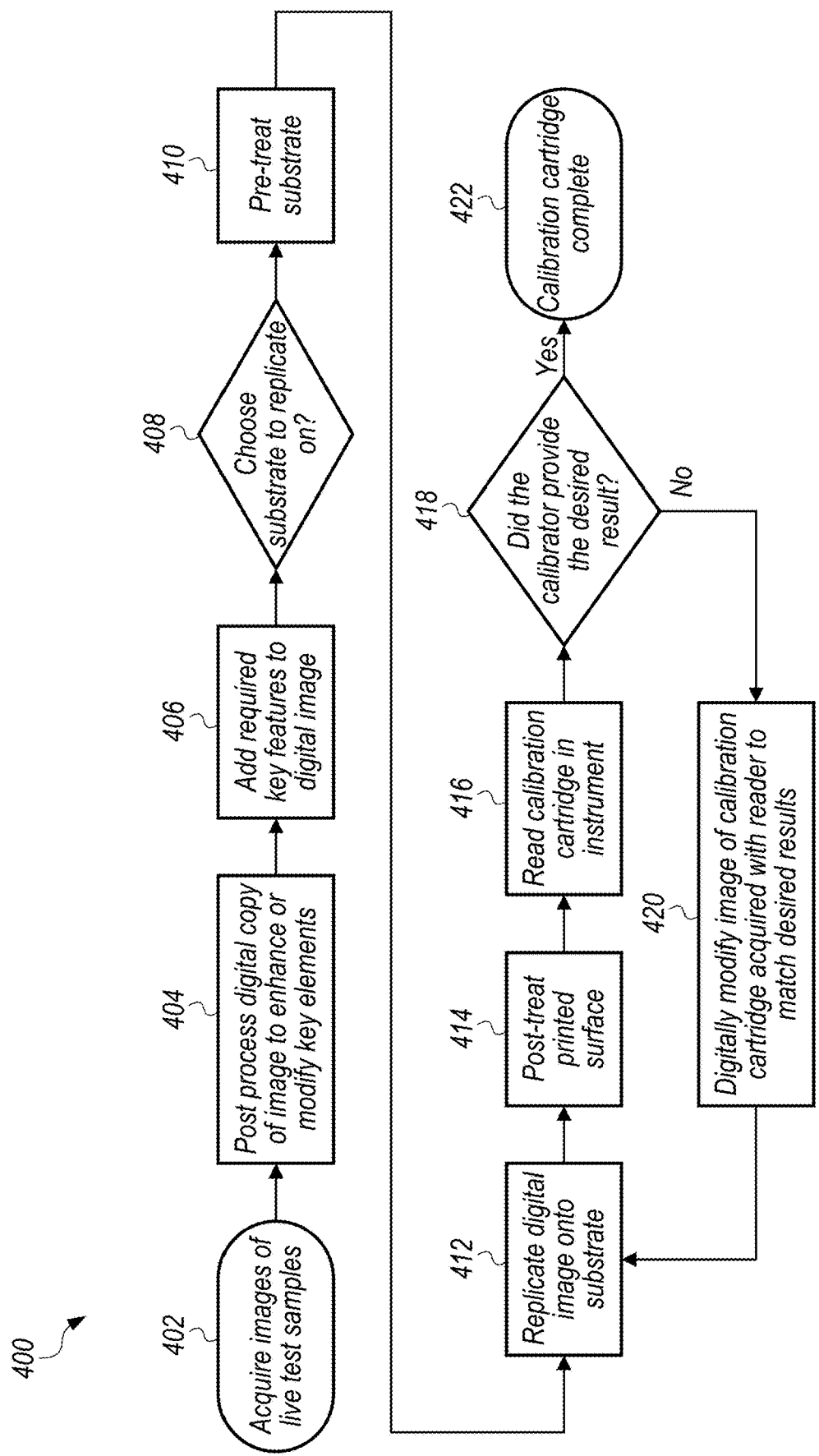
FIG. 11 depicts a flowchart of an embodiment of a method 40 used to create a calibration cartridge.

FIG. 11 depicts a flowchart of an embodiment of method 400 used to create a calibration cartridge. Method 400 may include reproducing (e.g., digitally replicating) live test samples on a substrate to create a calibration cartridge. In certain embodiments, method 400 is operated after the intial calibration cartridge decisions to determine the type of calibration cartridge have been made using process 300. Method 400 may be used to create a calibration cartridge for a specific reader 200 (e.g., the method is used by a user to create a calibration cartridge for the reader being used by the user).

Method 400 may begin with acquiring digital images of live test samples using reader 200 in 402. Live test samples may include, but not be limited to, test strips (e.g., used in lateral flow tests), dry chemistry pads, colorimetric reagents, and/or liquid samples in vials or cuvettes. The digital images may be acquired using a specific user's reader 200. For example, the digital images may be acquired using a specific reader 200 that will also be used by the user to test or assay samples at a later time. In certain embodiments, acquiring the digital images includes capturing raw image sensor data of the images. Acquiring the digital images using the specific reader 200 may ensure that the identical (e.g., actual) optical environment is used to capture the nuances of the live test samples (e.g., images are captured using the actual instrument's optical sensor and illumination setup such as shown in FIG. 4). As such, the images acquired may be highly representative of the actual sample being tested and will include any irregularities or defects present on the test strip or cassette region within the field of view of the sensor in reader 200. In some embodiments, during image acquisition, additional sensor and illumination variables specific to the instrument being used may be altered to mimic non-standard sensor and illumination conditions that may be encountered when testing in the field. The image(s) acquired may be transferred outside the instrument (e.g., reader 200) for further digital processing. For example, the acquired image(s) (or data for the images) may be sent to a computer processor connected to reader 200 using a network or data cable for further digital processing. In some embodiments, the computer processor (or other processor) may store the image(s) or image data in memory associated with the processor to allow future access to the data for replicating the image(s) at any time desired.

In 404, digital copies of the acquired image(s) may be post processed. Post processing of the digital copies may enhance or modify key elements in the images. For example, elements such as, but not limited to, background color, line thickness, consistency, spacing, shape, or intensity may be enhanced or modified in the digital copies of the images. In certain embodiments, the images are manipulated to match certain testing requirements such as, but not limited to, adding a background hue to represent a specific sample type such as blood, urine, or muddy water. In some embodiments, additional changes may be made to the actual line formation to further enhance or correct a defect. FIGS. 12-16 (described below) depict several embodiments of test strips and dry chemistry samples with a variety of characteristics that can be added or altered to the test features in a digital image(s).

Figure 12:
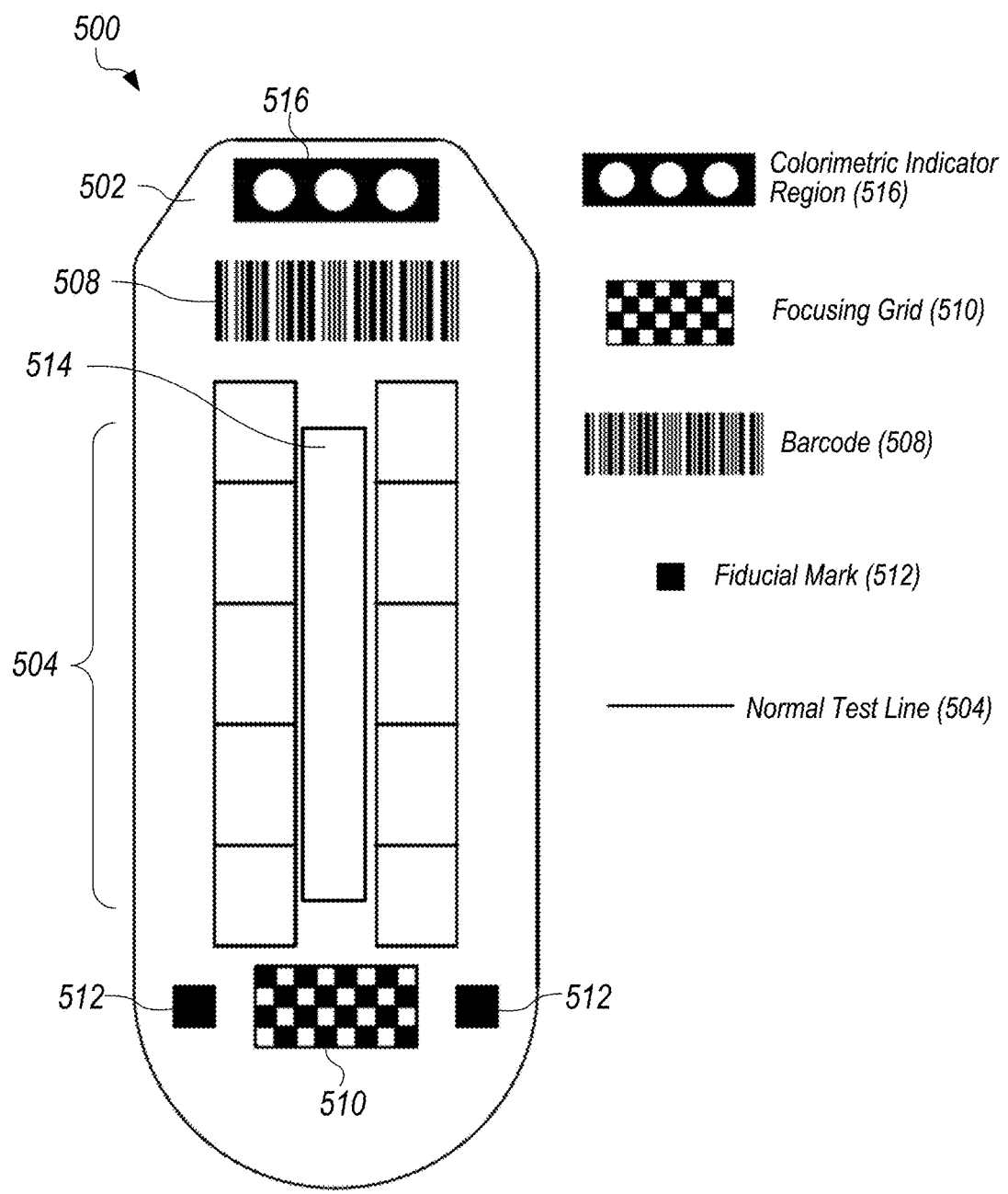
FIG. 12 depicts a representation of an embodiment of a calibration standard used for lateral flow testing.
Figure 13:
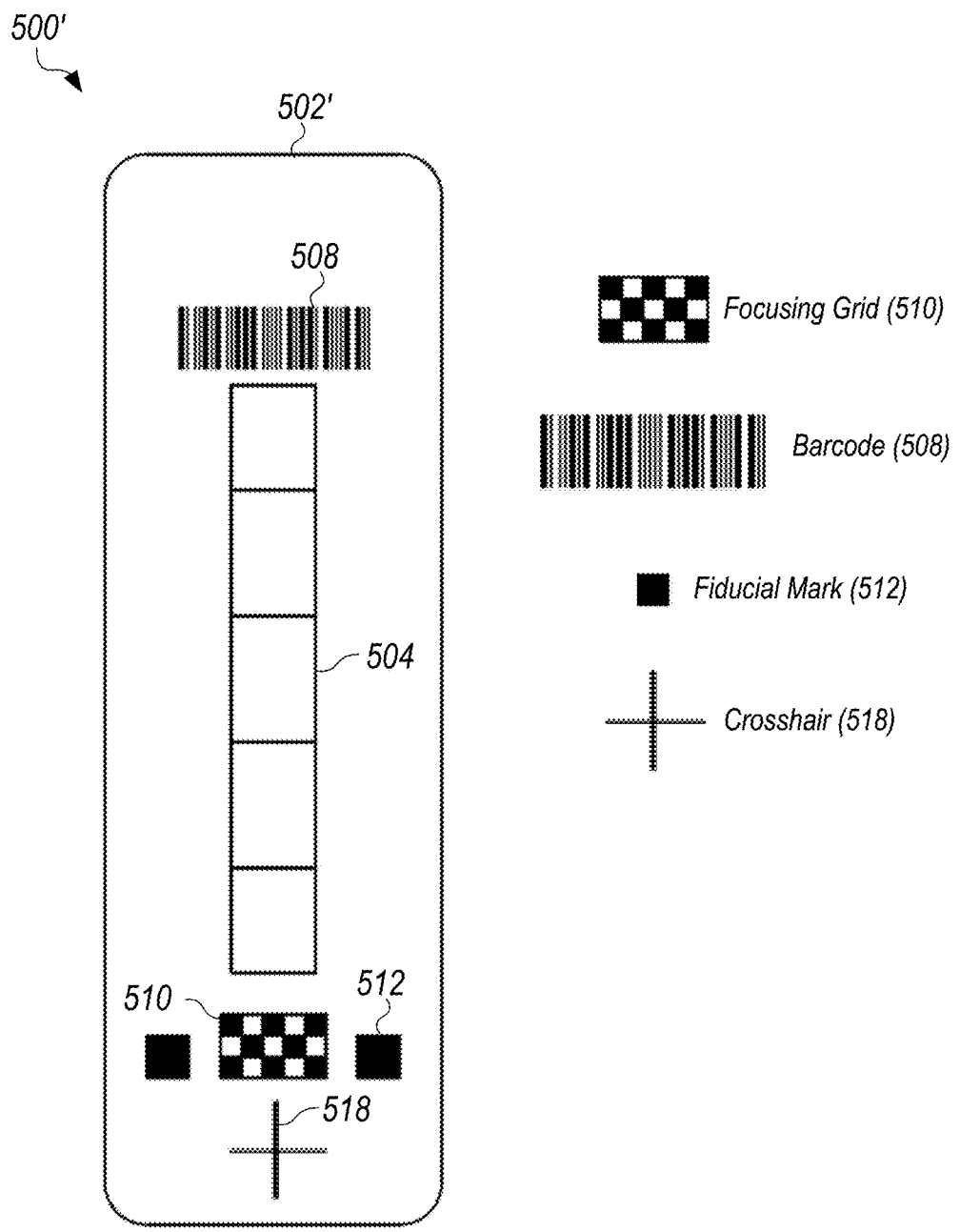
FIG. 13 depicts a representation of another embodiment of a calibration standard 500 used for lateral flow testing.

In 406, key required features may be added to the digital image(s). The features may be digitally added to the digital image using standard image enhancement software such as Adobe Illustrator® (Adobe Inc., San Jose, Calif.) and/or standard image enhancement techniques. Key required features may include, but not be limited to, fiducials, a focus grid, and a reference color standard. FIGS. 12 and 13 (described below) depict several of these key features that can be added to the digital image(s) to allow for a more robust calibration process for the reader.

In 408, a substrate to replicate the image(s) on may be selected. Substrates may be chosen to be, for example, a plastic substrate, a metal substrate, a paper substrate, a natural fiber substrate, a synthetic fiber substrate, or a nitrocellulose substrate. Other types of substrates may also be contemplated that emulate an actual live testing medium. For example, some optical biochips may be run on silicon substrates whereas others may be run on porous plastic membranes. Being capable of applying the replicated image(s) to multiple substrates may provide added flexibility for the method of creating calibration cartridges or samples. In some embodiments, multiple substrates may be combined in order to properly emulate an actual live testing medium. For example, a plastic cartridge that houses nitrocellulose strips may emulate an actual live testing medium.

In 410, the substrate may be pre-treated to allow for image(s) to be added to the substrate. Pre-treating the substrate may include, for example, bead blasting the substrate, sanding the substrate, and/or acid etching the substrate. The substrate may be pre-treated to create a proper optical background. Creating the proper optical background may include mimicking the proper light reflectivity of an actual assay. For example, bead blasting a plastic substrate may provide a low reflectivity surface on the substrate.

In 412, the digital image(s) are reproduced on (e.g., replicated on or added to) the substrate. Reproducing the digital image(s) on the substrate may include, but not be limited to, printing, engraving, embossing, etching, impressing, and/or chemically treating on the substrate to reproduce the digital image(s) on the substrate. In certain embodiments, the digital image(s) are reproduced on the substrate by direct printing using UV (ultraviolet) cured inks. Additional methods that can adequately modify the substrate surface may, however, also be utilized. For example, FIG. 13 (described below) depicts a crosshair that may be etched into the substrate surface. Etching may provide a more precise position of the crosshair than may be capable using a printing technique.

Figure 17:
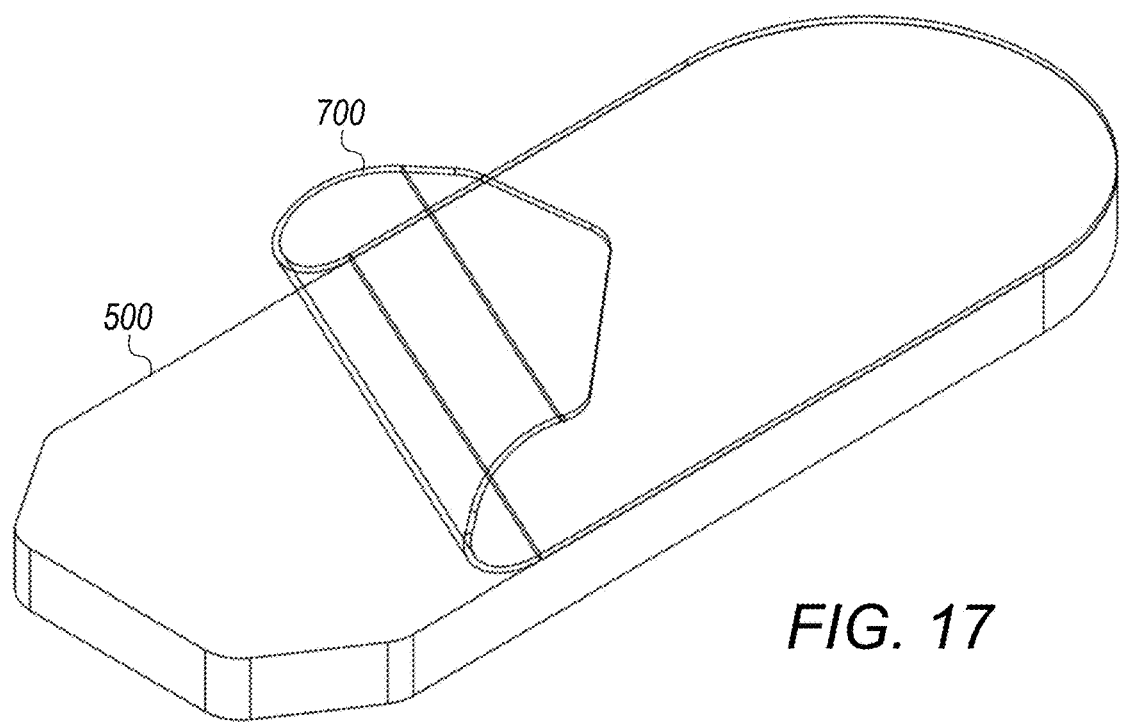
FIG. 17 depicts a representation of an embodiment of a calibration standard with a matte transparent layer being applied to the standard.

In certain embodiments, in 414, the replicated (reproduced) image(s) on the substrate (e.g., the printed images) are post-treated. Post-treatment of the replicated image(s) on the substrate may be used to produce a calibration cartridge (e.g., the optical reference standard). Post-treatment of the replicated image(s) on the substrate may include, but not be limited to, applying glare reduction coating. The glare reduction coating may be, for example, an opaque pressure sensitive adhesive applied to the substrate. Post-treatment of the substrate (e.g., the calibration cartridge) may further reduce optical glare and surface reflectivity. Post-treatment of the substrate may also provide a method to add additional color and wavelength specific filters to further modify the substrate. FIG. 17 (described below) depicts an example of a calibration cartridge (e.g., substrate) with a matte transparent layer (e.g., a matte film or coating) applied on the surface.

In 416, the calibration cartridge is placed in reader 200 (e.g., the reader used to acquire the digital image(s)) to read (test) the calibration cartridge. Reading (testing) the calibration cartridge may be used to calibrate and determine optical output for the calibration cartridge. In 418, results from the testing of the calibration cartridge may be assessed to verify that the calibration cartridge provides intended or desired results (e.g., determine that testing results using the calibration cartridge/standard are satisfactory or meet certain criteria). If the calibration cartridge is verified to provide the desired results, then the calibration cartridge may be considered complete in 422.

If the testing results are not satisfactory, then additional modification of the calibration cartridge may be made in 420. In 420, either the original digital image, or the image collected during the test in 402, may be modified to bring the testing results of the calibration cartridge closer to the desired results (e.g., make the testing results more satisfactory). After the modifications are made, method 400 may continue with returning to 412 to reproduce the digital image(s) on the substrate and generate a new or modified calibration cartridge.

As described herein, method 400 may be used produce a custom calibration standard (e.g., calibration cartridge) that is specific to both the instrument the standard is used in (e.g., a specific reader 200) but also to the actual live testing samples and mediums that will be used in the instrument. Thus, method 400 allows the integration of a standard optical calibration device with unique features that are directly representative of the optical signature produced by live samples.

Figure 15:
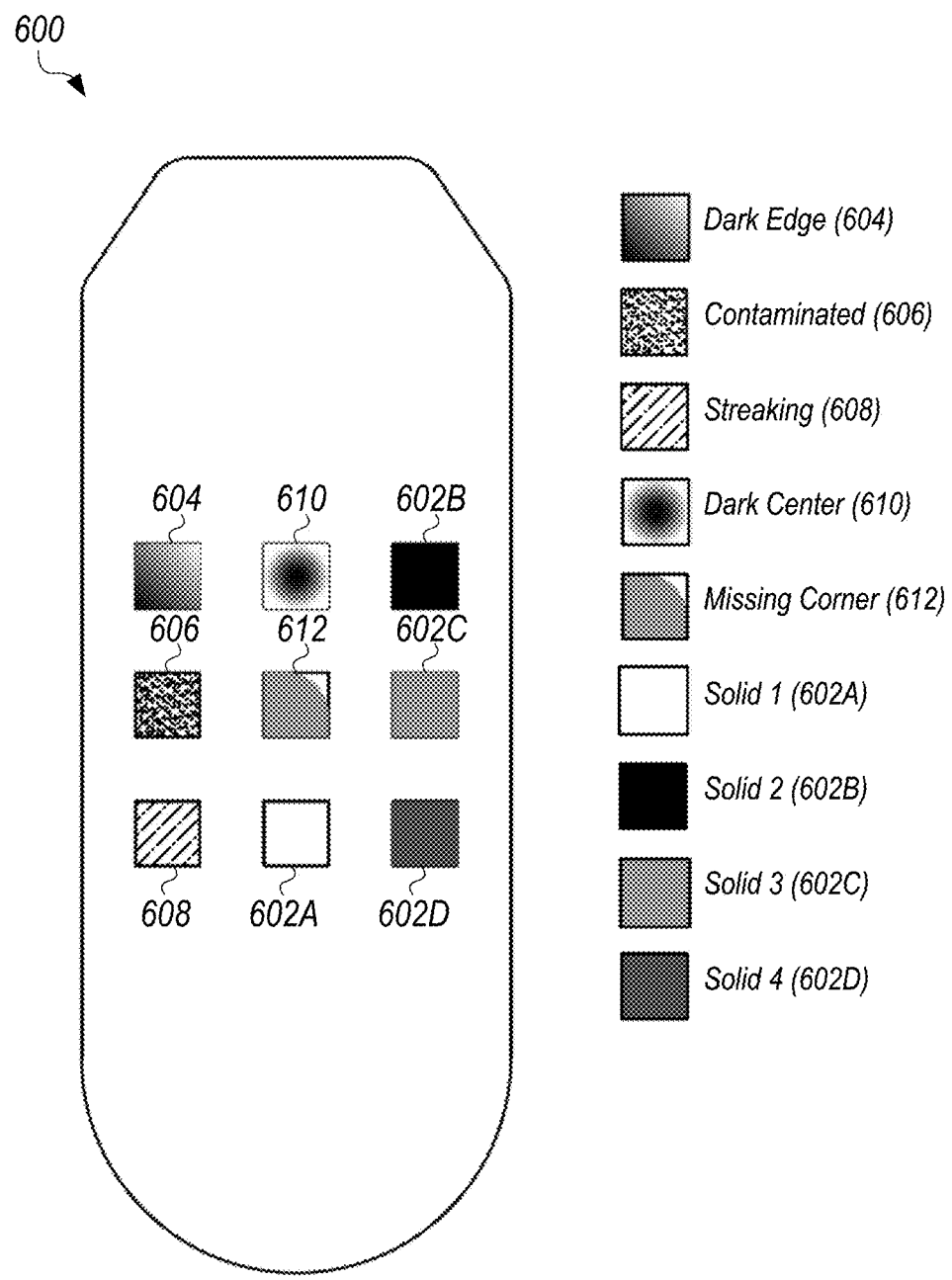
FIG. 15 depicts a representation of an embodiment of a calibration standard for a dry chemistry test.

Method 400 may be used to produce calibration standards for a variety of different uses. For example, one embodiment of a calibration standard that may be produced by method 400 includes a calibration standard with a substrate of white ABS (acrylonitrile butadiene styrene) plastic with ultraviolet cured ink (UV ink) printed onto the surface to emulate the lines of a lateral flow test strip. Another embodiment of a calibration standard that may be produced by method 400 includes a calibration standard with a substrate of white ABS (acrylonitrile butadiene styrene) plastic with UV ink printed onto the surface to emulate the color range of colorimetric dry chemistry tests. Depending on the range of color needed, the calibration standard could be a single standard with multiple colors, a set of standards with a single color on each standard, or a combination of the two. FIG. 15 (described below) depicts an example of an embodiment of a dry chemistry calibration standard.

FIG. 12 depicts a representation of an embodiment of a calibration standard used for lateral flow testing. In certain embodiments, calibration standard 500 is a multi-strip cassette standard (e.g., a standard having multiple strips of test and control lines). Calibration standard 500 may include body 502. In certain embodiments, body 502 is a solid piece of white ABS (acrylonitrile butadiene styrene) plastic. Body 502 may be formed through injection molding or machining of the plastic into the shape of a test cartridge. Ink may be printed on the surface of body 502 to imitate the test and control lines of a lateral flow strip. The plastic may be selected based on the appropriate color and reflectivity values needed to match a live sample medium such as, but not limited to, blood, serum, soil, or processed food residue.

In certain embodiments, standard 500 includes lines 504. Lines 504 may include simulated control and test lines (e.g., control and test lines digitally replicated using process 400). In some embodiments, lines 504 include at least one control line and four test lines, each test line having a different line intensity. In the embodiment depicted in FIG. 12, standard 500 includes two strips of lines 504 (e.g., two lateral flow test strips). Test lines may have the same intensity or, in some embodiments, have a variety of intensities to test a wider range (e.g., a full range) of reader 200.

In certain embodiments, optical features added to standard 500 (e.g., features added in 406 described above) include barcode 508 (which may be a variety of one-dimensional or two-dimensional barcode format types), focusing grid 510, fiducial marks 512, region 514, and/or colorimetric indicator region 516. Other regions may include optical features for determining background reflectance and/or luminosity measurements. Barcode 508 may be used for automatic test type identification in reader 200. For example, barcode 508, or another unique identifier, may be used for the system to automatically detect what features to look for on standard 500. Focusing grid 510 may be a checkered pattern grid used to confirm the focus of the optical system is adequate. Fiducial marks 512 may be markers used to ensure the viewable region on standard 500 is correct.

In some embodiments, as shown in FIG. 12, region 514 resides between the two strips of lines 504. Region 514 may be used for illumination or white balance calibration to adjust the color tone and brightness of the optical output of every device (e.g., reader 200) to match a consistent reference value. For example, region 514 may be printed with a specific shade of white to allow the white balance of the image output to be calibrated. In certain embodiments, standard 500 includes colorimetric indicator region 516. Colorimetric indicator region 516 may be used as digitally decodable symbology to indicate information such as, but not limited to, expiration, humidity, or temperature using degradable or reactive ink/chemicals in the indicator regions. For example, colorimetric indicator region 516 may include inks, dyes, chemicals, and/or pigments that change color based upon ambient temperature, humidity, light absorption across specific wavelengths (phosphorescence dyes), airborne chemicals, gases, vapors, or combinations thereof. Degradable inks or chemicals may be used for built-in expiration based on color or intensity change. The position of each optical feature may be optimized to be compatible with a particular device (e.g., reader 200). In some embodiments, colorimetric indicator region 516 may be a fluorometric indicator region.

FIG. 13 depicts a representation of another embodiment of a calibration standard 500 used for lateral flow testing. Standard 500' may be similar to standard 500 but standard 500' may have a different form factor than standard 500. For example, as shown in FIG. 13, standard 500' may have a single strip of lines 504 (e.g., a single lateral flow test strip). As shown by the different form factors of standard 500 and standard 500', the calibration standard may be formed to have different sizes and/or shapes to fit different test readers and to match the appearance of specific test cartridges.

In some embodiments, standard 500' includes crosshair 518. Crosshair 518 may be an optical feature at or near the bottom of standard 500'. Crosshair 518 may be used to determine and correct x- and y-axis offsets and standardize the optical region of interest across all test readers. By automatically identifying the location of crosshair 518 in reader 200, the region of interest (e.g., lines 504) may be customized for the unique field of view for each reader. Crosshair 518 may be printed, machined, embossed, or etched into body 502' of standard 500'.

As shown in FIGS. 12 and 13, the embodiments of standards 500 and 500' include space around features on the standards. Printing directly onto the substrates of the standards (e.g., white ABS used for the standards) may allow the space surrounding the test strip region (e.g., lines 504) to be colored in any way to match the appearance of an actual cartridge or cassette. Matching the appearance may allow minimal, if any, changes to be needed for the desired test strip reader to correctly identify the strip and read the lines.

As described above, lines 504 may be printed lines representing test and control lines. Lines 504 may be printed in any color to match the appearance of the actual lines on the lateral flow test. For example, red ink may be used to represent colloidal gold while blue ink may be used for lateral flow tests made with colored latex particles. The spacing and number of lines may be printed to match the appearance of the actual lateral flow test. In some embodiments, the line density is customized such that all test lines read as the same intensity, or the lines may be colored in a gradient so that a variety of line intensities can be evaluated. The ink used for producing lines 504 may be in the visible or non-visible wavelength spectrum. For example, lines 504 may be colorimetric or fluorescent lines.

When testing actual samples using lateral flow test strips in reader 200, it is common to have test strips that have abnormal line formation. Abnormal line formation may be caused, for example, by contaminants in the sample, cross reactivity of certain reagents, improper sample preparation, or a defective lateral flow device. This abnormal line formation can be interpreted by reader 200 in different ways that adversely affect the reported result. As such, it can be useful for reader 200 to recognize when these abnormalities exist and, subsequently, be able to label the abnormalities appropriately.

Figure 14:
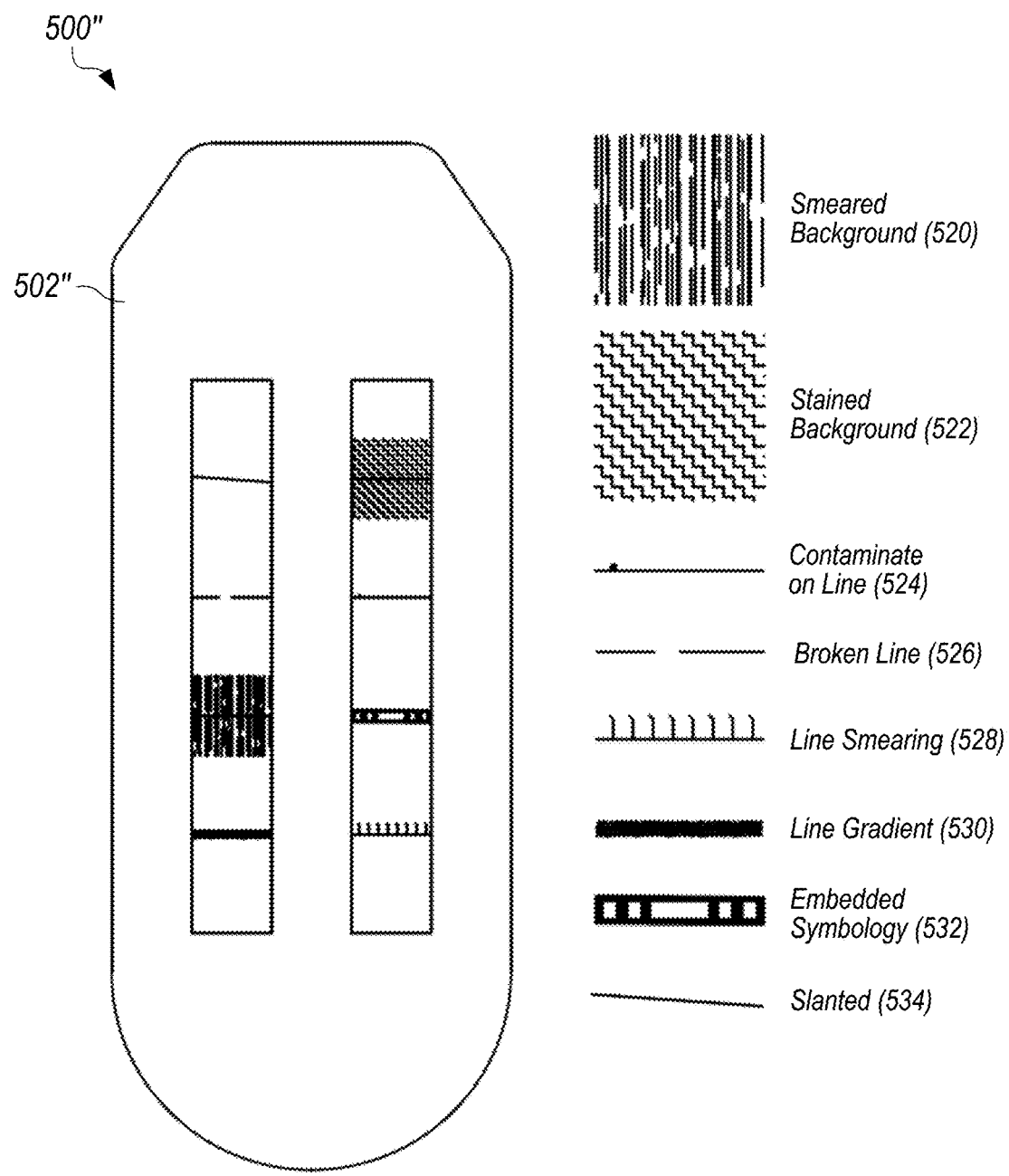
FIG. 14 depicts a representation of an embodiment of a calibration standard with alterations to the replicated digital image.

In certain embodiments, a calibration standard may include alterations to the replicated digital image to represent common abnormalities seen in lateral flow tests. FIG. 14 depicts a representation of an embodiment of a calibration standard with alterations to the replicated digital image. Standard 500" may include alterations that represent common abnormalities or discrepancies seen in lateral flow tests to allow reader 200 to more accurately recognize and/or adjust for these abnormalities. In some embodiments, the alterations may be digitally generated during processing of the digital image (e.g., in 404 of method 400). Examples of abnormalities that may be included on standard 500" include, but are not limited to, smeared background 520, stained background 522, contaminate on line 524, broken line 526, line smearing 528, line gradient 530, embedded symbology 532, and slanted line 534.

In smeared background 520, the background of a line may appear to be smeared if, for example, the color agent, such as colloidal gold, settles both above and below the test line or has an incomplete binding event with the antigen or antibody applied to the line. In stained background 522, the background of a line may appear to be stained if, for example, the liquid solution used for the test is not clear or has small particulates in it or if the lateral low device does not run to completion, thus leaving excess labeled reagent or solution near the test and control line regions. For contaminate on line 524, a contaminate such as a particulate of dust or dirt may appear on the line. For broken line 526, a broken line may occur if, for example, the test or control line antibodies/antigens are not printed in a solid line across the width of the test strip preventing the color agent from binding uniformly, or if the flow of the color agent is uneven and prevents the color agent from binding uniformly across the width of the strip.

For line smearing 528, a line may smear if, for example, small amounts the color agent, such as colloidal gold, binds just above the intended test or control line location, or there are interfering analytes that affect the chemical binding events. For line gradient 530, a line may appear to have a gradient if, for example, the test or control line antibodies were applied to the test strip in a such a way that the top of the intended line location is more or less concentrated than the bottom of the line, which creates uneven binding of the color agent throughout the height of the line. For embedded symbology 532, a line may include embedded symbology that can be decoded by the reader to provide information about the line such as its expected intensity result. The symbology may be made with the same printing ink or another kind of substance that can only be viewed in the dark or under ultraviolet light. These substances may provide the required information without affecting the actual test line appearance or intensity. For slanted line 534, a slanted line occurs if, for example, the test or control line antibodies are not placed perfectly straight across the strip or if the colloidal gold (or other color agent) binds unevenly across the width of the test strip.

A calibrator standard that incorporates one or more of these common abnormalities or defects (e.g., alterations to the replicated digital image) may allow the user to systematically test the reader's (e.g., reader 200) capability to appropriately recognize, correct for, and/or categorize these events. Additionally, using these alterations may allow the user to introduce to reader 200 new custom abnormality and defect scenarios that can be used to train, program and algorithmically identify these scenarios in the future by the reader. Additionally, when these non-standard lines (e.g., alterations) are recognized by reader 200, each non-standard line type may be assigned a unique symbology code similar to a barcode. Assigning the unique symbology code may allow reader 200 to automatically recognize the abnormality it was presented with and thus each calibration standard would have a unique digital fingerprint.

In some embodiments, calibration standards created by method 400 are used to calibrate and/or validate a reader (e.g., reader 200) used to analyze colorimetric dry chemistry tests. FIG. 15 depicts a representation of an embodiment of a calibration standard for a dry chemistry test. Calibration standard 600 may include one or more regions of color rather than the strips of test lines used in standards 500, 500', 500". In certain embodiments, standards used in dry chemistry tests may include a single standard that has an array of multiple distinct colors printed on it (such as standard 600), or a set of standards with a limited number of colors printed on each standard or a single color printed on each standard.

In certain embodiments, as shown in FIG. 15, standard 600 includes multiple solid color regions 602A, 602B, 602C, 602D. The multiple solid color regions 602 depict the ideal appearance of a dry chemistry test (e.g., "ideal dry chemistry test") because the color and intensity are the same throughout the entire test region. Solid regions like regions 602 may be used to color calibrate the system to a specific set of colors that are present in the dry chemistry test that is intended to be used. For example, analyzing the range of standard colors in regions 602 on each reader 200 may provide a way to color calibrate the individual readers to ensure that every reader will give the same result. When the actual colors in regions 602 are known, each reader 200 may be calibrated to output the correct color representation using these color standards, ensuring all readers will give the same result. The colors used in standard 600 may be custom mixed to match the target colors for the desired test type, which may increase the accuracy of results obtained from reader 200.

In some embodiments, standard 600 includes alterations that are made to represent non-ideal test samples. For example, as shown in FIG. 15, standard 600 may include dark edge 604, contaminant 606, streaking 608, dark center 610, and/or missing corner 612. Dark edge 604 may be an edge that causes the appearance of a gradient of color throughout the sample region. Contaminated 606 may represent a contaminated sample such as one with dirt or small particles in the solution. The contaminated sample may create a surface for imaging that is not a single solid color, but rather a dirty or speckled test. Streaking 608 may occur on a dry chemistry test when the sample is not mixed well before being applied to the test paper. Dark center 610 may result if, for example, not enough of the liquid test solution was added, which could result in a gradient that is seen radiating from the center of the test region. Missing corner 612 may result if, for example, the test paper is damaged and a portion of the test region does not react to the sample in the same way as the rest of the test paper, which creates a corner with a different color.

In some embodiments, standard 600 includes one or more optical features found on standard 500 or standard 500', depicted in FIGS. 12 and 13, respectively. The optical features may be added in 406 of method 400 as described above. A white balance region may be useful for standard 600 as the hue and intensity of color may have an impact on determining a test result using reader 200 in dry chemistry tests. Focusing grid 510 may be useful to check the focus of the optical system.

Figure 16:
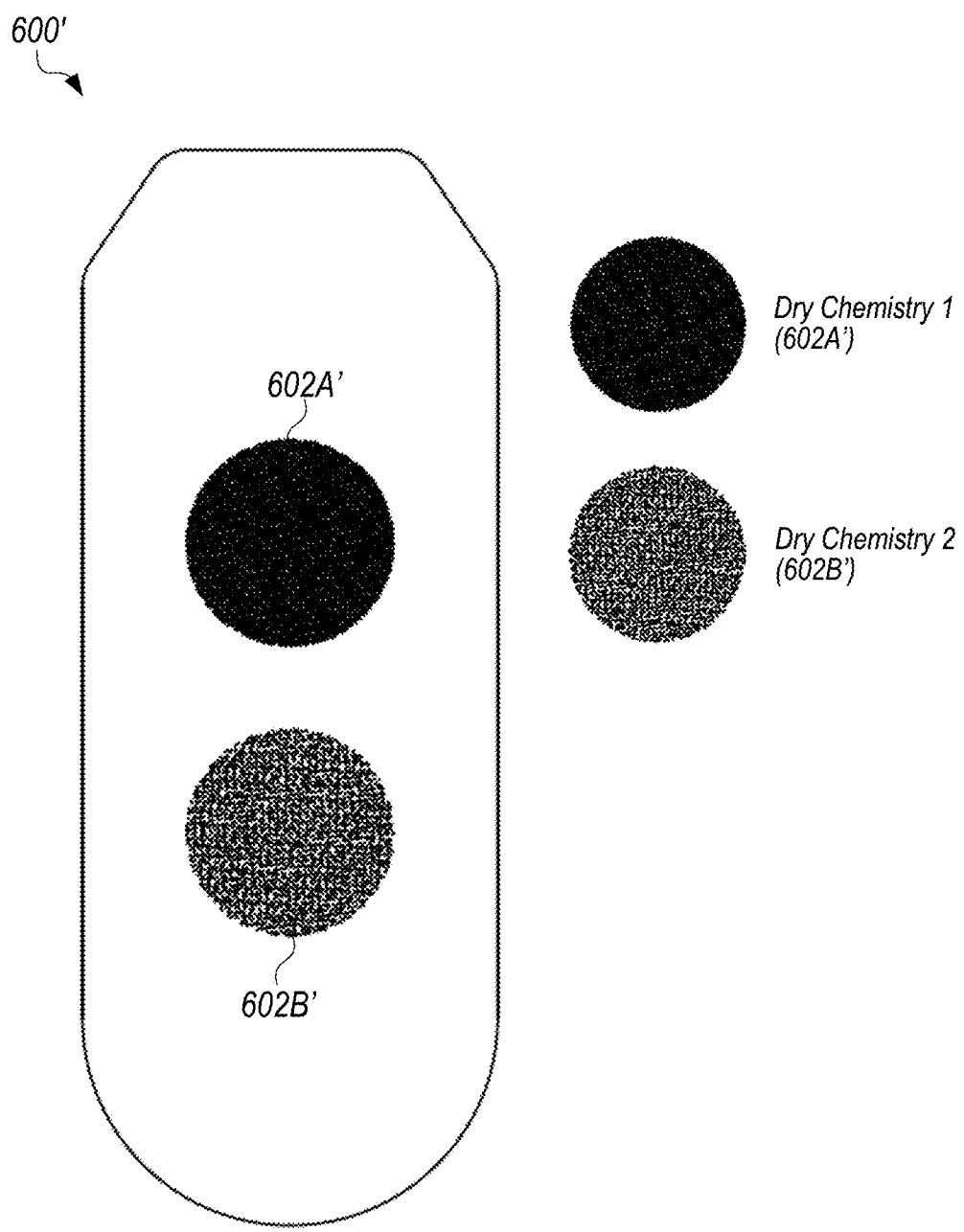
FIG. 16 depicts a representation of another embodiment of a calibration standard for a dry chemistry test.

FIG. 16 depicts a representation of another embodiment of a calibration standard for a dry chemistry test. Standard 600' may be used for a dry chemistry test where a large surface area is to be analyzed. Regions 602A' and 602B' are large color regions used to color calibrate readers 200. Standard 600' may be useful to ensure that all test strip readers 200 analyze a specific color the same way across a large region of interest.

In certain embodiments, standards 600 and 600' are produced using similar substrates to standards 500, 500', 500". For example, standards 600 and 600' may be produced using substrates of white ABS (acrylonitrile butadiene styrene) plastic. While ABS plastic may be used for the standards described above, other materials such as metal, paper, or nitrocellulose may also be contemplated as described herein. Additionally, while white is described as the color for ABS or the printed material, other colors may also be contemplated depending on the type of test to provide custom background colors for the calibration standards.

In certain embodiments, as described above, UV printing is used to print lines and features on the substrate for the calibration standards. UV printing may be used to create consistent line color and density, or solid regions of color. UV printing uses ultraviolet light to cure ink after it is applied to the surface of a material (e.g., ABS plastic). Some UV printers may use a premixed ink that can be matched to the color agent used in the test strip. Premixing the ink may create a consistent result because the ink that is applied to the material is a single color, unlike most traditional paper printers that print a matrix of multi-colored dots that appear to the eye to be one color. Providing a consistent color may be advantageous when analyzing a test line or colored region of interest as the color may be more consistent throughout for the result to read identical to a live test strip.

In some embodiments, calibration standards described herein may include a purposely altered background color to represent live samples that have contaminated backgrounds. Live samples may have contaminated backgrounds due to undesired or uncontrolled items in the sample tested such as dirt, blood, suspended particles, dyes, or colored fluids. Providing calibration standards with purposely altered background color may be useful for a specific customer that uses the rapid tests to routinely sample a medium that can have a variable amount of contamination present that could affect the optical test results. This type of calibration standard with an altered background may be used to verify that the reader can adequately perform the test despite the background contamination present. Examples of altered test lines and backgrounds are depicted in FIG. 14, described above.

In some embodiments, calibration standards may have additional calibration information on the front or back side of the standard. The calibration information may include, for example, test or lot information, calibration standard type, serial ID of calibration standard, etc. The test and/or lot information for the standard could be encoded in a barcode (e.g., barcode 508 depicted in FIGS. 12 and 13) that the reader could decode to automatically identify the calibration standard. The barcode could also be used to differentiate types of calibration standards such as standards with the same line intensity vs. standards with gradient line intensities. The serial ID of the calibration standard may also be marked on its surface such that the reader can keep a record of which standard was used during the calibration process.

In certain embodiments of calibration standards described herein, post-treatment of the surface (described above in 414 of method 400) is used depending on the optical properties of the test strip reader. For example, post-treatment of the surface may be needed in some embodiments to eliminate the glare caused by the ink or the surface of the plastic material. In some embodiments, a matte transparent film or coating (e.g., a matte pressure sensitive adhesive (PSA)) is applied to the surface after the ink has cured or dried. FIG. 17 depicts a representation of an embodiment of calibration standard 500 with matte transparent layer 700 being applied to the standard. Matte transparent layer 700 may be applied as an adhesive film, as shown in FIG. 17, or the matte transparent layer may be applied as a clear liquid that dries matte on the surface of standard 500. In some embodiments, matte transparent layer 700 may be a coating applied to the surface.

Matte transparent layer 700 may be used to eliminate glare and protect the surface from wear and degradation. When matte transparent layer 700 is applied, the glare caused by the optical system in reader 200 may be significantly reduced. Reducing glare may ensure that standard 500 will read the same in any position within reader 200 by reducing abnormalities caused by angular illumination and detection differences caused by instrument specific alignment and manufacturing differences. Matte transparent film layer may also serve as a protective layer that prevents the ink or substrate from getting damaged or discolored. Matte transparent layer 700 may be replaced periodically if the matte transparent layer becomes dirty or damaged, preserving the appearance of standard 500 over time. In some embodiments, matte transparent layer 700 may be repositionable on the surface (e.g., the layer may be repositioned to adjust optical properties of the layer relative to the surface). In some embodiments, matte transparent layer 700 may be used to adjust the calibration standard optical qualities to match a particular sample medium innate absorbance and/or reflectance profile. In some embodiments, matte transparent layer 700 is modified to accept, reject, or enhance specific wavelengths and/or polarizations of light.

Figure 18:
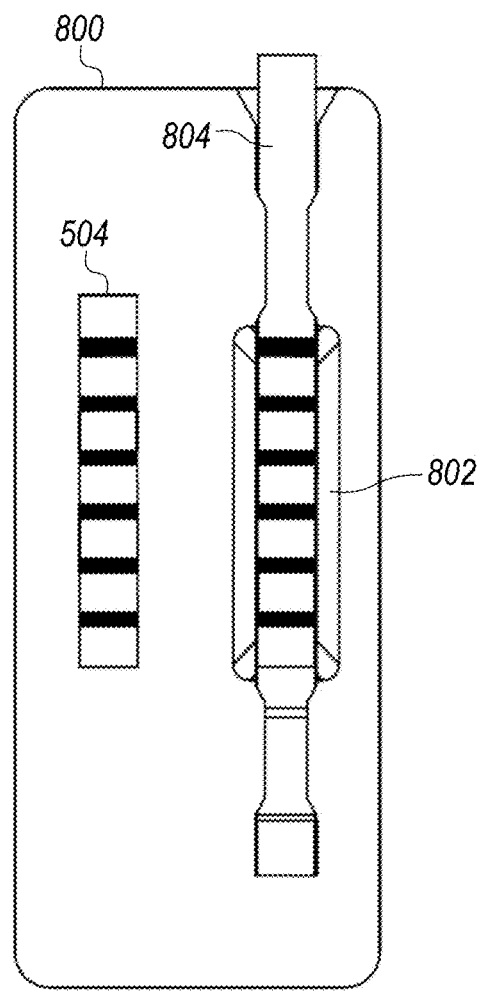
FIG. 18 depicts a representation of an embodiment of a calibration standard with a region for a live test strip.

In some embodiments, a calibration standard cartridge may include a port for insertion of a live test strip into the cartridge. FIG. 18 depicts a representation of an embodiment of calibration standard 800 with a region for a live test strip. The left side of standard 800 may include lines 504, which are reproduced from acquired images using method 400. Thus, the left side of standard 800 may be used as a calibrator for reader 200. The right side of standard 800 may include region 802. Region 802 may include an opening or port on standard 800 that allows live test strip 804 to be inserted in the standard. In some embodiments, region 802 may be used for a chemistry reagent pad or liquid test sample to be inserted in the standard. Using both the left side and right side of standard 800, reader 200 may be able to simultaneously read a live test and a replicated (calibrated) test on a single cartridge.

In any of the embodiments described above, the substrate of a calibration standard may have a different thickness than utilized in a cartridge. For example, a substrate for a calibration standard may be made of a thinner piece of material that has the size and shape of a test strip rather than a cartridge. Thus, the calibration standard may become a replicated test strip instead of a replicated cartridge. The replicated test strip may then be placed into a cartridge (e.g., cartridge 222) prior to inserting into reader 200. An advantage of using a replicated test strip may be that a cartridge or cassette that holds multiple strips simultaneously could use a single test strip standard, moved to each position of the cartridge, to analyze all potential areas of interest in view. Using the same replicated test strip may potentially eliminate any minor variation between replicate strips in a multi-strip standard.

In some embodiments, a series of calibration standards and/or a series of replicate test strips on a single calibration standard may be used to represent time lapse of an actual assay. For example, each standard or test strip may represent a different time during a reaction process.

In certain embodiments, one or more process steps described herein may be performed by one or more processors (e.g., a computer processor) executing instructions stored on a non-transitory computer-readable medium. For example, process 400, shown in FIG. 11, may have one or more steps performed by one or more processors executing instructions stored as program instructions in a computer readable storage medium (e.g., a non-transitory computer readable storage medium).

Figure 19:
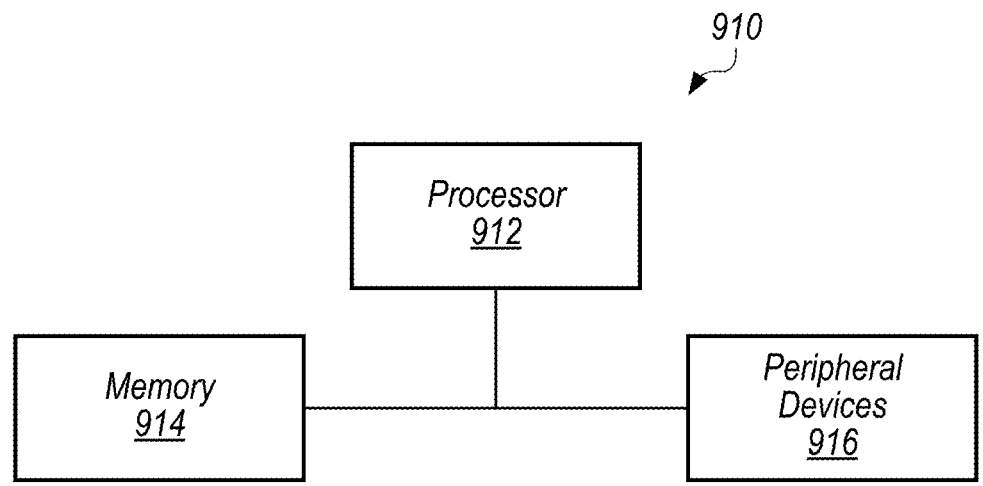
FIG. 19 depicts a block diagram of one embodiment of exemplary computer system.

FIG. 19 depicts a block diagram of one embodiment of exemplary computer system 910. Exemplary computer system 910 may be used to implement one or more embodiments described herein. In some embodiments, computer system 910 is operable by a user to implement one or more embodiments described herein such as process 400, shown in FIG. 11. In the embodiment of FIG. 19, computer system 910 includes processor 912, memory 914, and various peripheral devices 916. Processor 912 is coupled to memory 914 and peripheral devices 916. Processor 912 is configured to execute instructions, including the instructions for process 400, which may be in software. In various embodiments, processor 912 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 910 may include more than one processor. Moreover, processor 912 may include one or more processors or one or more processor cores.

Processor 912 may be coupled to memory 914 and peripheral devices 916 in any desired fashion. For example, in some embodiments, processor 912 may be coupled to memory 914 and/or peripheral devices 916 via various interconnect. Alternatively or in addition, one or more bridge chips may be used to coupled processor 912, memory 914, and peripheral devices 916.

Memory 914 may comprise any type of memory system. For example, memory 914 may comprise DRAM, and more particularly double data rate (DDR) SDRAM, RDRAM, etc. A memory controller may be included to interface to memory 914, and/or processor 912 may include a memory controller. Memory 914 may store the instructions to be executed by processor 912 during use, data to be operated upon by the processor during use, etc.

Figure 20:
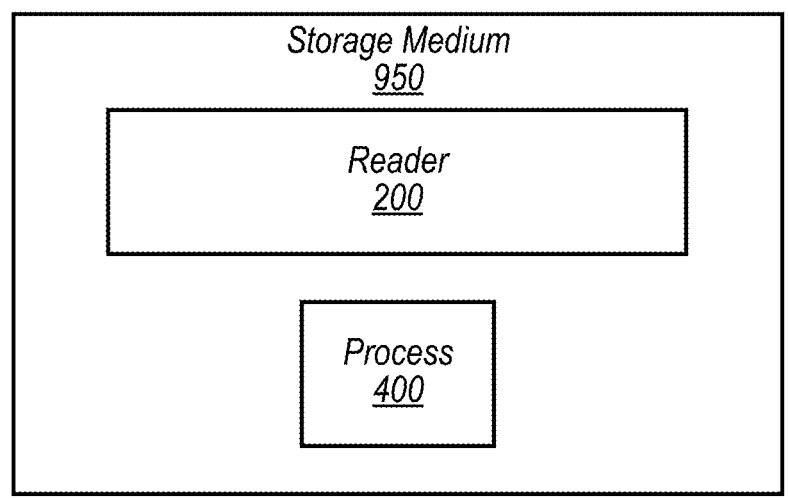
FIG. 20 depicts a block diagram of one embodiment of a computer accessible storage medium.

Peripheral devices 916 may represent any sort of hardware devices that may be included in computer system 910 or coupled thereto (e.g., storage devices, optionally including computer accessible storage medium 950, shown in FIG. 20, other input/output (I/O) devices such as video hardware, audio hardware, user interface devices, networking hardware, etc.).

Turning now to FIG. 20, a block diagram of one embodiment of computer accessible storage medium 950 including one or more data structures representative of wireless reader 200 (depicted in FIG. 4) and one or more code sequences representative of process 400 (shown in FIG. 11). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 950 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A calibration standard system, comprising:
    an optical analysis system with a port;
    a live test sample positioned on or in a sample structure, the sample structure having a size and shape corresponding to a size and shape of the port in the optical analysis system;
    a calibration substrate having a size and shape corresponding to the size and shape of the port in the optical analysis system, wherein the calibration substrate includes:
        a reproduction of a digital image of the live test sample on a surface of the calibration substrate, the digital image of the live test sample being captured by the optical analysis system with the sample structure positioned in the port, wherein the reproduction on the surface of the calibration substrate includes at least one digital alteration to the digital image of the live test sample, the at least one alteration representing at least one live testing abnormality; and
        at least one additional optical feature formed on the surface of the calibration substrate, wherein the at least one additional optical feature is distinct from the reproduction on the surface of the calibration substrate.

2. The calibration standard system of claim 1, wherein the digital image is positioned on a portion of the calibration substrate configured to be inserted into the port on the optical analysis system.

3. The calibration standard system of claim 1, wherein the at least one additional optical feature is formed on the calibration substrate using image enhancement software and techniques.

4. The calibration standard system of claim 1, wherein the at least one additional optical feature comprises at least one of a one-dimensional barcode, a two-dimensional barcode, a focusing grid, a fiducial mark, a colorimetric indicator region, a fluorometric indicator region, a white balance region, or a crosshair.

5. The calibration standard system of claim 1, wherein the at least one additional optical feature is comprised of a material that is a reactive ink, a dye, and/or a chemical or pigment that is sensitive to temperature, humidity, specific wavelengths of light, airborne chemicals, gases, vapors, or combinations thereof.

6. The calibration standard system of claim 1, further comprising a matte transparent layer applied to the calibration substrate, wherein the matte transparent layer at least partially covers the digital image on the calibration substrate.

7. The calibration standard system of claim 1, further comprising a repositionable matte transparent layer applied to the calibration substrate that is modified to accept, reject, or enhance specific wavelengths and/or polarizations of light.

8. The calibration standard system of claim 1, further comprising a region on the calibration substrate for housing and positioning of a live test strip, chemistry reagent pad, or liquid test sample.

9. The calibration standard system of claim 1, wherein the reproduction on the surface of the calibration substrate includes at least one antibody or antigen test line and at least one antibody or antigen control line.

10. The calibration standard system of claim 9, wherein the at least one live testing abnormality is an abnormality on the at least one antibody or antigen test line.

11. The calibration standard system of claim 9, wherein the at least one antibody or antigen test line has an embedded symbology.

12. The calibration standard system of claim 1, wherein the at least one additional optical feature is either fluorescent or phosphorescent.

13. The calibration standard system of claim 1, wherein the calibration substrate is one of: a plastic substrate, a metal substrate, a paper substrate, a natural fiber substrate, a synthetic fiber substrate, or a nitrocellulose substrate.

14. The calibration standard system of claim 1, wherein the reproduction on the surface of the calibration substrate includes at least one ideal dry chemistry test region with one non-ideal test region.

15. The calibration standard system of claim 1, wherein the reproduction on the surface of the calibration substrate includes at least one antibody or antigen test line, at least one antibody or antigen control line, and at least one dry chemistry region with an abnormality.

\* \* \* \* \*